US012617140B2

(12) United States Patent
Dorrmann et al.

(10) Patent No.: US 12,617,140 B2
(45) Date of Patent: May 5, 2026

(54) APPARATUS AND METHOD FOR FORMING PLASTIC PREFORMS INTO PLASTIC CONTAINERS WITH CLEAN ROOM

(71) Applicant: KRONES AG, Neutraubling (DE)

(72) Inventors: Beate Dorrmann, Woerth an der Donau (DE); Frank Winzinger, Regensburg (DE); Daniel Peter, Hemau (DE); Alexandra Zinkl, Tegernheim (DE); Florian Geltinger, Donaustauf (DE); Juergen Soellner, Beratzhausen (DE); Christian Wittmann, Hemau (DE)

(73) Assignee: KRONES AG, Neutraubling (DE)

( * ) Notice: Subject to any disclaimer, the term of this patent is extended or adjusted under 35 U.S.C. 154(b) by 164 days.

(21) Appl. No.: 18/244,852

(22) Filed: Sep. 11, 2023

(65) Prior Publication Data

US 2024/0269912 A1 Aug. 15, 2024

(30) Foreign Application Priority Data

Sep. 9, 2022 (DE) ..................... 10 2022 123 064.3

(51) Int. Cl.
B29C 49/42 (2006.01)
B29C 49/46 (2006.01)
(Continued)

(52) U.S. Cl.
CPC .. B29C 49/42065 (2022.05); B29C 49/42405 (2022.05); B29C 49/42808 (2022.05);
(Continued)

(58) Field of Classification Search
CPC .............. B29C 49/46; B29C 49/42405; B29C 49/42808; B29C 49/80; B29C 49/42065;
(Continued)

(56) References Cited

U.S. PATENT DOCUMENTS 6,134,866 A 10/2000 Schoenewolff et al. ........ 53/561
7,393,373 B1 7/2008 Krippner et al.
(Continued)

FOREIGN PATENT DOCUMENTS

CN 104339627 A 2/2015
CN 220883358 5/2024 ............. B29C 49/12
(Continued)

OTHER PUBLICATIONS

U.S. Appl. No. 18/244,852, filed Sep. 11, 2023, Dorrmann et al.
(Continued)

*Primary Examiner* — Monica A Huson
(74) *Attorney, Agent, or Firm* — HAYES SOLOWAY P.C.

(57) ABSTRACT

An apparatus for forming plastic preforms into plastic containers, having a transport device which transports the plastic preforms to be formed along a predetermined transport path, wherein the transport device has a rotatable transport carrier wherein a plurality of forming stations are arranged. The forming stations each have blow-molding devices within which the plastic preforms can be formed into the plastic containers by applying a flowable medium. The forming stations each have application devices for applying the flowable medium to the plastic preforms, and the apparatus has a feed device for feeding plastic preforms to be formed to the transport apparatus, and a discharge device for discharging formed containers from the transport device. The apparatus has a clean room within which the plastic preforms or the plastic containers are transported at least sectionally. The apparatus has an ejection device to eject plastic preforms or plastic containers from the transport path.

20 Claims, 6 Drawing Sheets

(51) Int. Cl.
*B29C 49/80* (2006.01)
*B29L 31/00* (2006.01)

(52) U.S. Cl.
CPC .............. *B29C 49/46* (2013.01); *B29C 49/80* (2013.01); *B29C 2049/4697* (2013.01); *B29L 2031/712* (2013.01)

(58) Field of Classification Search
CPC ........ B29C 49/4205; B29C 2049/7833; B29C 49/249; B29C 2049/2412; B29C 49/12; B29C 49/78; B29C 2795/007; B29C 49/36; B29C 49/786; B29C 49/4281; B29C 2049/4635; B29C 49/42095; B29C 49/42412; B29C 2049/4697; B29C 49/42418; B29C 2949/0715; B29L 2031/712
See application file for complete search history.

(56) References Cited

U.S. PATENT DOCUMENTS

| | | | | |
|---|---|---|---|---|
| 8,647,101 | B2 | 2/2014 | Quetel et al. | ........... B29C 49/42 |
| 8,770,957 | B2 | 7/2014 | Laumer | ................... B29C 49/36 |
| 8,771,584 | B2 | 7/2014 | Voth | ........................ B29C 49/68 |
| 11,072,106 | B2 | 7/2021 | Martini et al. | ......... B29C 49/38 |
| 11,084,202 | B2 | 8/2021 | Hayakawa | ............. B29C 49/36 |
| 2013/0040009 | A1 | 2/2013 | Laumer | ................... B29C 49/30 |
| 2014/0325941 | A1 | 11/2014 | Knott et al. | ......... B65B 55/027 |
| 2018/0009646 | A1 | 1/2018 | Hayakawa et al. | ....... B67C 7/09 |
| 2018/0354670 | A1 | 12/2018 | Schinelli | ................... B65C 9/40 |
| 2020/0198215 | A1 | 6/2020 | Mueller et al. | ......... B29C 49/46 |
| 2023/0001623 | A1 | 1/2023 | Gerhards | ............... B29C 49/42 |
| 2024/0009913 | A1 | 1/2024 | Wittmann et al. | ...... B29C 49/46 |

FOREIGN PATENT DOCUMENTS

| | | | | |
|---|---|---|---|---|
| DE | 102009007138 | 8/2010 | ............ | B65B 43/56 |
| DE | 102010032964 | 2/2012 | ............ | B29C 49/64 |
| DE | 102013022281 | 2/2015 | ............ | B29C 49/06 |
| DE | 102010018582 | 1/2018 | ............ | B29C 49/42 |
| DE | 2731631 | 5/2018 | .............. | A61L 2/08 |
| DE | 102019128019 | 4/2021 | ............ | B67C 3/22 |
| DE | 102019008631 | 6/2021 | .............. | A61L 2/20 |
| EP | 2556943 | 6/2018 | ............ | B29C 49/42 |
| WO | WO2010020529 | 2/2010 | ............ | B29C 49/36 |
| WO | WO2021239936 | 12/2021 | ............ | B29C 49/46 |

OTHER PUBLICATIONS

U.S. Appl. No. 18/240,909, filed Aug. 31, 2023, Roth et al.
Search Report issued in German Patent Appln. Serial No. 10 2022 122 085.0, dated Mar. 27, 2023, with machine English translation, 9 pages.
Search Report issued in German Patent Appln. Serial No. 10 2022 123 064.3, dated May 15, 2023, with machine English translation, 14 pages.
Search Report issued in European Patent Appln. Serial No. 23191993. 7, dated Dec. 1, 2023, with machine English translation, 19 pages.
Search Report issued in European Patent Appln. Serial No. 23195972. 7, dated Feb. 2, 2024, with machine English translation, 15 pages.
Office Action issued in Chinese Application No. 202322327559.2, with machine translation, dated May 8, 2024, 4 pgs.

Viewing direction Fig. 4

Viewing direction for Fig. 6

APPARATUS AND METHOD FOR FORMING PLASTIC PREFORMS INTO PLASTIC CONTAINERS WITH CLEAN ROOM

BACKGROUND OF THE INVENTION

The present invention relates to an apparatus and a method for forming plastic preforms into plastic containers and in particular plastic bottles. Such apparatuses and methods have long been known from the prior art. Plastic preforms are first heated and subsequently reshaped into the containers in a forming device such as, for example, a stretch blow molding machine. More recently, apparatuses and methods have become known in which this forming process proceeds under sterile conditions.

Accordingly, WO 2021/239936 A1 describes such an apparatus for producing plastic containers. In this case, when feeding the plastic preforms, a clean room is formed within which the plastic preforms are transported. In addition, a sterilization device is provided which sterilizes the plastic preforms after heating them. Furthermore, a sterile air source is provided which applies sterile air to the containers along their transport path.

This apparatus accordingly allows the production of plastic containers under sterile conditions. However, the measures necessary for this are relatively laborious.

The present invention is therefore based on the object of making such apparatuses and methods simpler.

SUMMARY OF THE INVENTION

An apparatus according to the invention for forming plastic preforms into plastic containers has a transport device, which transports the plastic preforms to be formed along a predefined transport path. In this case, the transport device has a rotatable transport carrier on which a large number of forming stations is arranged, wherein such forming stations each have blow molding devices, within which the plastic preforms can be formed, and in particular expanded, into the plastic containers by applying a flowable and, in particular, gaseous medium. Furthermore, the forming stations each have application devices in order to apply flowable medium to the plastic preforms.

Furthermore, the apparatus has a feed device to supply plastic preforms to be formed to the transport device, as well as a discharge device for removing formed containers from the transport device.

Furthermore, the apparatus has a clean room within which the plastic preforms are at least sectionally transported. Preferably, at least the plastic preforms transported by the feed device and/or the plastic preforms transported by the discharge device are arranged within this clean room.

In a preferred embodiment, the apparatus has an ejection device to eject plastic preforms or plastic containers from the transport path.

The clean room is preferably designed such that the plastic preforms are transported outside the clean room at least partially or sectionally during their expansion.

The clean room is preferably designed such that the plastic preforms are transported outside the clean room at least temporarily during their expansion.

In another preferred embodiment, a low concentration of sterilization medium can be applied to a region outside the clean room, in particular the region in which the forming stations are arranged.

This does not necessarily mean that there is no cleanroom atmosphere around the plastic preforms during transport, but merely that outer sides of the blow molding devices are not located in the cleanroom for a certain period of time or partially or sectionally.

Preferably, the transport path is composed of several sections. In a first section of the transport path, the plastic preforms are fed from the feed device to the transport carrier; in a second section, the plastic preforms are formed into the plastic containers in the forming stations; and in a third section, the formed plastic containers are discharged from the discharge device (in particular after the being transferred from the forming stations).

In a preferred embodiment, the feed device and/or the discharge device have a rotatable transport carrier with a plurality of holding devices for holding the plastic preforms. In this embodiment, the feed device and/or the discharge device, and in particular both, are designed as transport stars or transport wheels.

The holding devices can be designed as clamps. They can grip and hold the containers at least in the mouth region. The clamps can have two pincer arms which can be opened for receiving and dispensing preforms or finished blow-molded containers, and closed to grip and transport them.

Preferably, at least the transport carrier of the feed device and/or the transport carrier of the discharge device and preferably both transport carriers are arranged within the clean room.

Particularly preferably, the apparatus has a heating device for heating the plastic preforms, which is arranged in front of the actual forming device in the transport direction.

Particularly preferably, the apparatus has a filling device for filling the produced plastic containers.

Particularly preferably, an internal pressure in a region of the feed device and/or in a region of the discharge device is higher than in a region of the forming device and/or the heating device. Accordingly, for example, this corresponding room or the corresponding rooms in which the plastic preforms are fed or in which plastic containers are discharged are subjected to a higher internal pressure. This room is preferably the above-mentioned clean room which is therefore exposed to the aforementioned overpressure.

Particularly preferably, a pressure in the heating device is equal to or lower than in a transport region in which the plastic preforms are transported to the forming device. Particular preference is given to a pressure difference between 0.5 Pa and 20 Pa, preferably between 2 Pa and 20 Pa, and particularly preferably between 6 Pa and 18 Pa, and particularly preferably between 8 Pa and 15 Pa.

However, an internal pressure in the heating device is particularly preferably greater than an ambient pressure.

In a preferred embodiment, at least one drive device for driving the transport device is arranged outside the clean room. This arrangement outside the clean room can be achieved in that, for example, a drive is arranged outside the clean room and a shaft leads into the clean room. However, the arrangement outside the clean room would also be possible with the entire transport device being inside the clean room, but drives and the like, for example, are sealed off from the clean room.

In a preferred embodiment, at least one drive device for driving the feed device and/or the discharge device is arranged outside the clean room. This arrangement outside the clean room can be achieved in that, for example, a drive is arranged outside the clean room and a shaft leads into the clean room. However, the arrangement outside the clean room would also be possible with the entire transport device being inside the clean room, but drives and the like, for example, are sealed off from the clean room.

Between the drive device for driving the feed device and/or the discharge device and the clean room, a seal can be arranged which can, for example, be an elastic material.

In an advantageous embodiment, the application device can always be arranged outside the clean room, i.e., for example during a complete revolution of the transport carrier.

In another advantageous embodiment, the apparatus has another application device which applies a sterilization agent to the plastic preforms in those regions in which they are transported from the heating device to the forming device, at least partially and preferably completely.

In particular, this can be hydrogen peroxide (H2O2). Particularly preferably, a permanent application of a low concentration of hydrogen peroxide to the plastic preforms is provided. This can be achieved, for example, in that the atmosphere is permanently loaded or enriched with a sterilization agent and in particular with hydrogen peroxide in said rooms in which the plastic preforms are transported.

The apparatus preferably has at least one pressure measuring device arranged within the clean room. The apparatus preferably has at least one pressure measuring device arranged in a region of the heating device.

In another preferred embodiment, the apparatus has at least one sensor device which senses a proportion of a sterilization agent, in particular within the clean room.

Preferably, the clean room is designed such that the plastic preforms transported by the feed device and/or the discharge device are transported through this clean room. It is therefore proposed here that the plastic preforms and/or the plastic containers are also transported through said clean room.

In another preferred embodiment, the clean room is designed such that the plastic preforms are transported outside the clean room at least temporarily during their expansion. The forming device itself takes up a very large space and is accordingly a clean room difficult to maintain in this area.

In a preferred embodiment, the apparatus comprises a sterilization device for sterilizing, and/or a cleaning device for cleaning the plastic preforms and/or plastic containers. The cleaning device is preferably a rinser which applies a flowable medium to the plastic preforms or plastic containers, in particular air and in particular ionized air. The cleaning device preferably has an ionization device for ionizing air.

In another preferred embodiment, the apparatus has a sterilization device for sterilizing, and/or a cleaning device for cleaning the plastic preforms and/or the plastic containers, wherein the sterilization device and/or cleaning device are preferably arranged upstream from the forming device and particularly preferably upstream from the heating device (i.e., the heating device for heating the plastic preforms).

In another preferred embodiment, the cleaning device is arranged on an infeed star to the heating device.

In particular, such a sterilization device is preferably also provided in the region of the apparatus in which the plastic preforms are formed and/or in a region of the transport carrier on which the forming stations are arranged. Accordingly, such a sterilization device is preferably also provided in a region of a blowing wheel.

In another preferred embodiment, the apparatus has another application device which applies a sterilization medium on the plastic preforms during their expansion. Preferably, this is the same application device which applies flowable medium to the plastic preforms to expand them. It would accordingly be possible to add a certain amount of sterilization agent to the blowing air which expands the plastic preforms.

In addition, it would be conceivable to provide such a sterilization device into a transfer region in which plastic preforms are fed to the blowing wheel or in which containers are discharged from the blowing wheel.

In another preferred embodiment, the apparatus has at least three compressed air reservoirs which provide compressed air under different pressures to the forming stations. These compressed air reservoirs are preferably designed as annular channels.

These compressed air reservoirs are preferably filled or fillable with sterile air. In another preferred embodiment, at least one of these compressed air reservoirs can also be filled with a sterilization agent. This can preferably be the compressed air reservoir which is filled with the lowest pressure level.

For the expansion of the plastic preforms, multiple pressure levels are preferably used, for example a pre-blowing pressure P1, an intermediate blowing pressure P1 and a final blowing pressure P2.

In a preferred embodiment, a channel which produces a sterile air supply is provided above the containers and/or the forming stations. This is in particular provided in the region of the transport device or the blowing wheel. In this region, no clean room is preferably provided. As a result of this embodiment, it is possible to supply sterile air to the plastic preforms which are transported in particular over short distances outside the clean room so that no contamination occurs in this region. This is in particular the distance in which the plastic preforms are transported from the feed device to the transport device, or the distance in which the formed containers are transported from the transport device to the discharge device.

The apparatus preferably has a closing device, for example a door, in order to seal off the clean room region, in particular in the context of a sterilization mode. In a sterilization mode, this closing device can cover in particular an opening through which plastic preforms are transferred from the feed device to the transport device (for example the blowing wheel).

In this case, such a door is particularly preferably displaceable or rotatable in order to close the clean room.

Preferably, a drive for such a door is provided in the region in which the blowing wheel is also located, and preferably accordingly in a non-sterile region.

Particularly preferably, a lock is provided through which the plastic containers or the plastic preforms are transported from the clean room into the blowing wheel region. Such a lock could have, for example, a curved flat element which is adapted to a shape of another device of the apparatus such as to a mold carrier and a blowing nozzle passage corridor.

Furthermore, it would also be conceivable for such an opening or a door to project into a blowing module or the forming device.

In this way, a supply of the plastic preform in the nonsterile region is kept very short.

The blow molding devices can have one or more blow molds (for example in the case of so-called double cavities).

This modification is based on the idea that the plastic preform is arranged within a blow mold during the actual expansion, and therefore approximately sterile conditions prevail in any case. The critical region is accordingly the region in which the plastic preform is transferred to the blow molds.

The embodiments described here are intended to keep precisely this space particularly short.

In another preferred embodiment, the apparatus has a rinsing device for rinsing the plastic preforms with sterile air. This rinsing device could be provided in a region of the feed device.

In another advantageous embodiment, it would be possible for the plastic preform to be rinsed during its expansion or before or thereafter with sterile air. This can be achieved, for example, with a blowing nozzle even after the same has been lifted off with the throttled pressure. In addition, it is conceivable in this regard for another valve or also a proportional valve to be used in a valve block of the forming stations in order to effect such a rinsing through the blowing nozzle.

The individual forming stations preferably each have a valve unit, in particular so-called valve blocks, which have a plurality of valves in order to apply the above-mentioned different pressure levels to the plastic preforms.

It would also be conceivable to provide a seal between said lock, via which the plastic preforms are fed to the blowing wheel, which seal is between the mold carrier and/or the blowing nozzle and this lock.

In another advantageous embodiment, a supply device is provided which introduces or injects an additional gas, such as liquid nitrogen or $H_2O_2$, into the containers in order to maintain a positive pressure in the container before the application device, such as a blowing nozzle, is lifted off, and until the sterile zone is reached.

Additionally or alternatively, it would also be possible for a suction device to be provided next to or, adjacent to, or above the mouth of the containers, in particular the plastic preforms, which suction device sucks in gas in order to thereby maintain cleaner conditions.

In a preferred embodiment, the ejection apparatus is arranged outside the clean room. The ejection device can accordingly be provided in the region of the blowing wheel, for example in a region in which the plastic preform is to be transferred to a blow mold. This embodiment is advantageous since an ejection does not have to go through a sterile room boundary. In addition, it would also be possible to provide the ejection device in a region in which the formed containers are transferred from the blowing wheel to the discharge device.

Preferably, a lock opening, through which the plastic preforms or the containers are guided out of their clean rooms or into them, is adapted to a shape of the containers. In this way, the opening can be kept very small.

Furthermore, it would also be possible for a pivoting device to be provided which pivots the containers or plastic preforms for passage through this partition wall, for example by 90°, in order to the reby allow the opening to have a minimum cross section.

In a preferred embodiment, an opening through which the plastic preform or the plastic preforms are guided is adaptable and, in particular, adaptable to different containers or plastic preforms. Particularly preferably, a cross-sectional area of this passageway is less than twice as large as the cross-sectional area of the plastic preform or the container, preferably less than 1.8 times as large, preferably less than 1.5 times as large, and particularly preferably less than 1.4 times as large.

In another advantageous embodiment, the apparatus has a separating device in order to separate a filling device from the forming device. For example, a bulkhead can be provided, which is closed in particular during a sterilization process. In this case, it is possible to remove or move away a transport device such as a transport star.

In another advantageous embodiment, the apparatus has a sterilization and/or cleaning device for the sterilization and/or cleaning of the elements which treat the plastic preforms. These elements treating the plastic preforms or the plastic containers are in particular those elements which come into contact with the plastic preforms or the plastic containers.

These elements are preferably selected from a group of elements which contain blow molds, stretching rods, blowing nozzles, holding clamps and the like.

The apparatus preferably has a stretching unit which expands the plastic preforms to be expanded in their longitudinal direction during their forming process. Preferably, this stretching unit has a stretching rod which can be inserted into the plastic preforms. In this case, at least one drive of this stretching unit is particularly preferably arranged outside the clean room. Preferably, the stretching unit is arranged outside the clean room.

In another advantageous embodiment, the apparatus has a rinsing device for rinsing the plastic preforms to be expanded. This rinsing device can in particular rinse the plastic preforms with sterile air.

In another advantageous embodiment, the apparatus has a sterilization device for sterilizing the application devices. Furthermore, a heating device is preferably provided which heats the application device. For example, the blowing nozzles can be heated.

In another advantageous embodiment, the apparatus has an inspection device for inspecting the plastic preforms or plastic containers. Particularly preferably, this inspection device is arranged in front of the ejection device. In this way, defective containers can, for example, be detected and ejected.

In another advantageous embodiment, the apparatus has at least one sensor device which detects parameters characteristic of the clean room such as an air pressure, a temperature, an air humidity, a proportion of a sterilization agent or the like.

In another advantageous embodiment, such an inspection device is arranged outside of the clean room. Accordingly, for example, an inspection of the preform quality can be performed at the entry into the blow molding machine, or also of the produced containers at their outlet from the forming device. Particularly preferably, elements of the inspection apparatus such as, for example, a camera are arranged outside the clean room, in particular since they are partially not resistant to sterilization agents.

In another preferred embodiment, a clean room boundary such as a lock wall is made of a transparent material so that an inspection can be performed through this transparent wall. A clean room boundary is preferably produced in a region of transparent material in which the plastic preforms are transferred from the feed device to the transport device.

In another advantageous embodiment, the apparatus has a sensor device (inside and/or outside the clean room) in order to measure the content of a sterilization agent such as $H_2O_2$. This sensor device can output a signal when a certain value is exceeded. In this way, safety of the users can be increased.

Particularly preferably, the inspection device has one or more image recording devices which inspect the plastic preforms or the containers.

Furthermore, it is possible for an inspection device itself to be arranged within the clean room, although encapsulated so that it is nevertheless protected against sterilization agents.

In another advantageous embodiment, the forming device has a filling device for filling the containers, and another treatment device is provided between the forming device and this filling device and treats the containers. In particular, this additional device is a transport device which changes a division between the containers during their transport. In addition, another sterilization device which sterilizes the containers can also be provided in this region. In addition, an equipping device can also be provided in this region which provides the containers with an overprint and/or a label. Furthermore, an inspection device which inspects the containers can also be provided in this region.

In a further preferred embodiment, the apparatus has another sterilization device for sterilizing elements treating the plastic preforms, wherein this sterilization device is preferably arranged at a position where no treatment of the containers takes place, and/or the additional sterilization device is arranged between the discharge device and the feed device (the forming device).

This region is particularly suitable for the sterilization of the elements treating the plastic containers, because in this region, the blow molds are usually open and no containers are treated.

More precisely (in the case of a rotary machine), this is in particular the region in which a finished container has been removed from the blow molds and no additional plastic preform has been introduced into the blow molds.

Furthermore, a cooling device can also be provided which cools the containers, in particular the container bases.

In another advantageous embodiment, the apparatus has a control device for controlling a gas pressure within the clean room. This control device can have pressure sensors, moisture sensors, temperature sensors and the like. Particularly preferably, the control device is a regulating device which regulates the pressure within a clean room. This regulating device can also include pressures in other regions of the system.

Particularly preferably, the apparatus has a robot device which is suitable and intended for carrying out treatment processes on at least one element of the forming device.

These treatment processes are particularly preferably selected from a group of treatment processes which include changing processes on these elements, changing processes of these elements, cleaning processes on these elements, sterilization processes on these elements and the like.

Particularly preferably, said element of the forming device is selected from a group of elements which contains blow molds, blow mold parts, blowing nozzles, stretching rods, gripping clamps, holding mandrels and the like.

In a preferred embodiment, said robot device is a changing device and in particular a changing robot. Particularly preferably, the robot device is arranged outside the clean room.

In a preferred embodiment, the robot device has a gripping device for gripping the respective element. Preferably, the gripping device itself can also be exchanged so that the robot device is suitable for changing several elements of the individual forming stations.

Said robot device is preferably a multi-axis robot device.

Particularly preferably, the robot device can be positioned between several positions of the apparatus. In particular, the robot device is arranged in a region of the forming device and in particular in a region of the blowing wheel.

The clean room should be defined by a low-contamination atmosphere. The low-contamination atmosphere can be produced by one or combinations of the following measures:

In a preferred embodiment, the low-contamination atmosphere of the device (within a machine guard) is placed under an overpressure compared to the ambient atmosphere, for example by air filtered through fine filters being blown into the room at least during production.

In another preferred embodiment, at least some and preferably all drives are arranged outside the clean room for a wide variety of movements of the cavity (blow mold device, i.e., blow mold or mold carrier), for example the drives for opening and closing the cavity, and/or the drives for moving a stretching rod, and/or the drives for raising or lowering a container and/or the drives for the movement of a blowing or filling nozzle (or application device).

In another preferred embodiment, the inner wall of the (clean) room is cleaned and/or sterilized at regular intervals, for example by spraying or vaporizing with lye, acid, disinfection liquid, hydrogen peroxide (gaseous or liquid).

In particular, the inner and outer sides of the cavities, blowing or filling nozzles and the stretching rods are included in cleaning and/or sterilization. In particular, however, the internal walls of the machine guard are also included.

In another preferred embodiment, the low-contamination environment is or will be sealed against the ambient atmosphere. In the case of a rotary machine, the seal can be a water lock or a rubber seal which seals the rotating part from the stationary part of the apparatus.

Particularly preferably, the containers or preforms are sterilized before being introduced into the low-contamination atmosphere.

In another preferred embodiment, the clean room is bordered by a wall which has at least one curved section and/or a bend which is preferably arranged between the region in which the plastic preforms are transported outside the clean room during their expansion on the one hand, and the feed device and/or the discharge device on the other hand. This curved region advantageously allows the section of the path to be shortened in which the plastic preform is transported outside the clean room but is not yet inside the blow mold.

The present invention also related to a method for forming plastic preforms into plastic containers, wherein a transport device transports the plastic preforms to be formed along a predetermined transport path, and wherein the transport device has a rotatable transport carrier on which a plurality of forming stations are arranged, wherein said forming stations each have blow molding devices within which the plastic preforms are formed into the plastic containers by applying a flowable and, in particular, gaseous medium, and the forming stations each have application devices which apply a flowable medium to the plastic preforms. Furthermore, a feed device transports the plastic preforms to the transport device, and a discharge device discharges the finished containers from the transport device. In addition, the apparatus has a clean room within which the plastic preforms are at least sectionally transported. In particular, the plastic preforms are fed to the transport device in this clean room, and/or the formed containers are discharged from the transport device within this clean room.

Advantageously, the apparatus has an ejection device which ejects (individual) plastic preforms or plastic containers out of the transport path.

With regard to the method, it is therefore also proposed that, in particular, defective plastic preforms or plastic containers are preferably ejected at least one position along the entire transport path of the plastic preforms.

In a preferred method, the plastic preforms are transported outside the clean room at least temporarily during their expansion.

In a preferred method, the plastic preforms or plastic containers are sterilized and/or disinfected and/or cleaned during their transport from the feed device to the discharge device. It is furthermore possible for the plastic preforms to also be sterilized before they reach the forming device. However, it is additionally proposed that further sterilization and/or cleaning is carried out with disinfection on the transport path of the plastic preforms during their expansion, and/or during the supply of the plastic preforms into the blow molds, and/or during the removal of the plastic containers from the blow molds.

In another advantageous method, the plastic preforms or plastic containers are inspected and preferably, in response to an inspection, an ejection of individual plastic preforms or plastic containers is carried out.

Preferably, a sterilization agent is supplied to the plastic preforms at least temporarily during their expansion. This can take place, for example, during a pre-blowing process in which a pre-blowing pressure is applied to the plastic preforms.

Preferably, the plastic preforms are sterilized and/or rinsed with sterile air within the clean room.

The plastic preforms are preferably inspected.

In another preferred method, a low concentration of sterilization medium is applied to a region in which the plastic preforms and/or the plastic containers are transported during their transport from the feed device to the discharge device.

In another preferred method, a sterilization medium is at least temporarily applied to treatment elements which treat the plastic preforms or the transport device which transports the plastic preforms (in particular the so-called blowing wheel).

BRIEF DESCRIPTION OF THE DRAWINGS

Further advantages and embodiments can be seen in the accompanying drawings.

In the Figures.

DETAILED DESCRIPTION OF THE INVENTION

Figure 1:
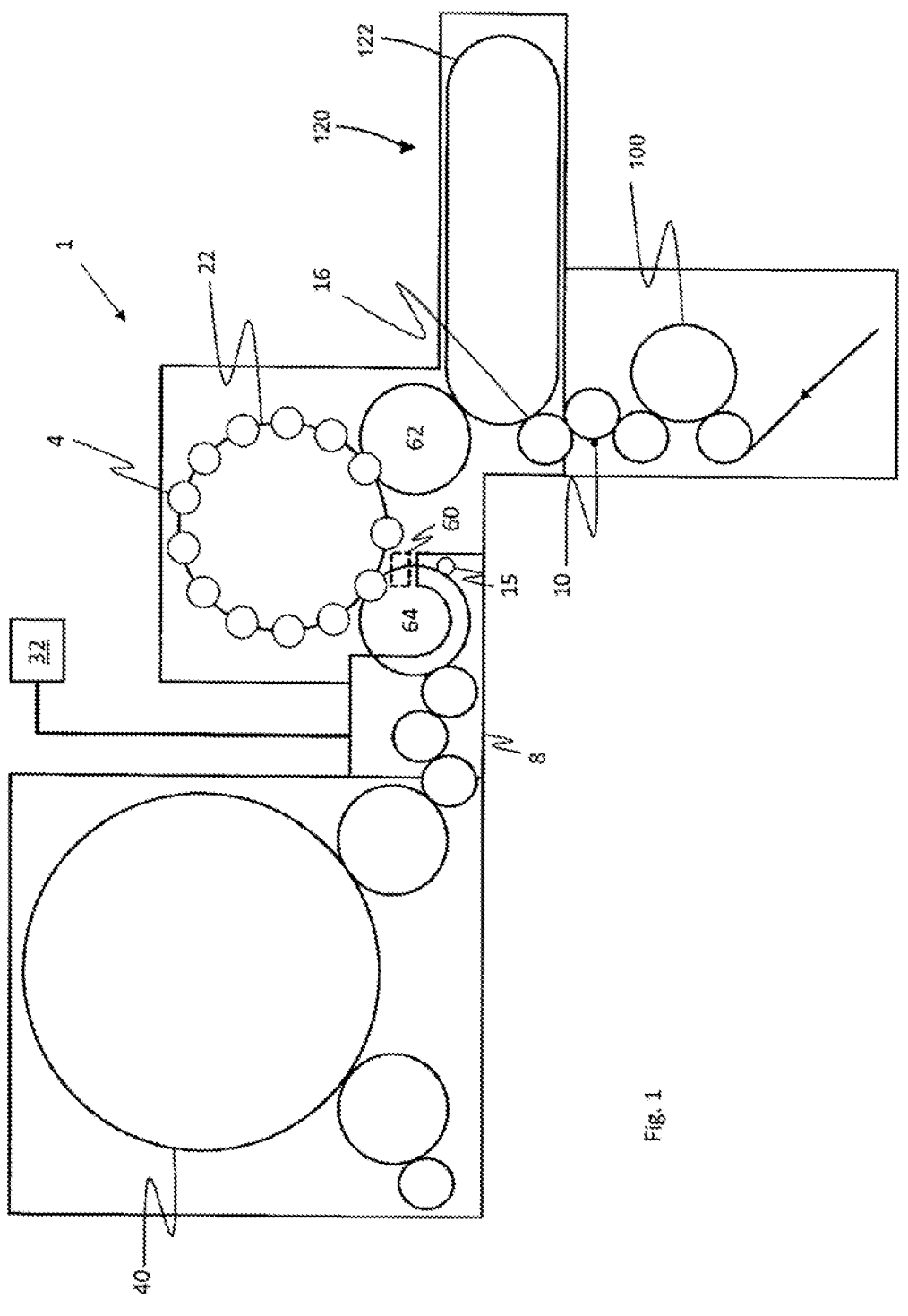
FIG. 1 shows a schematic representation of an apparatus according to the invention.

FIG. 1 shows a schematic representation of an apparatus 1 according to the invention. This has a rotatable transport carrier 22, in particular a so-called blowing wheel, on which a plurality of forming stations 4 are arranged.

These forming stations each have blow molds which are arranged on blow mold carriers. Each of these forming stations preferably has a stretching unit, which in turn has a stretching rod which can be inserted into the plastic preforms to be expanded in order to expand them in their longitudinal direction.

The reference sign 62 designates a feed device, in particular a feed star, which supplies the plastic preforms 10 to be expanded to the individual forming stations 4. The reference sign 64 designates a discharge device which discharges the formed containers 15 from the forming device.

The reference sign 60 designates an ejection device which serves to eject plastic containers, in particular defectively manufactured plastic containers.

This ejection device is preferably arranged in a region in which the plastic preforms are transferred from the transport carrier to the discharge device.

The reference sign 8 designates a clean room which preferably surrounds components of the apparatus 1. It can be seen that the discharge device 64 is arranged at least partially within this clean room.

However, the transport carrier 22 is preferably not arranged within the clean room 8. This means that the formation of the plastic preforms preferably does not take place within the clean room 8.

The reference sign 32 designates a sterile air supply device by means of which sterile air can be supplied to the clean room.

The reference sign 40 designates a filling device which preferably fills the formed containers with a liquid and in particular a beverage.

The reference sign 120 designates a heating device which heats the plastic preforms to be formed. This heating device preferably has a transport apparatus 122 which transports the plastic preforms.

In addition, the heating device preferably has stationary heating device past which the plastic preforms are transported for the purpose of heating them.

The reference sign 100 designates a sterilization device which sterilizes the plastic preforms even before their entry into the heating device 120.

Figures 2, 3:
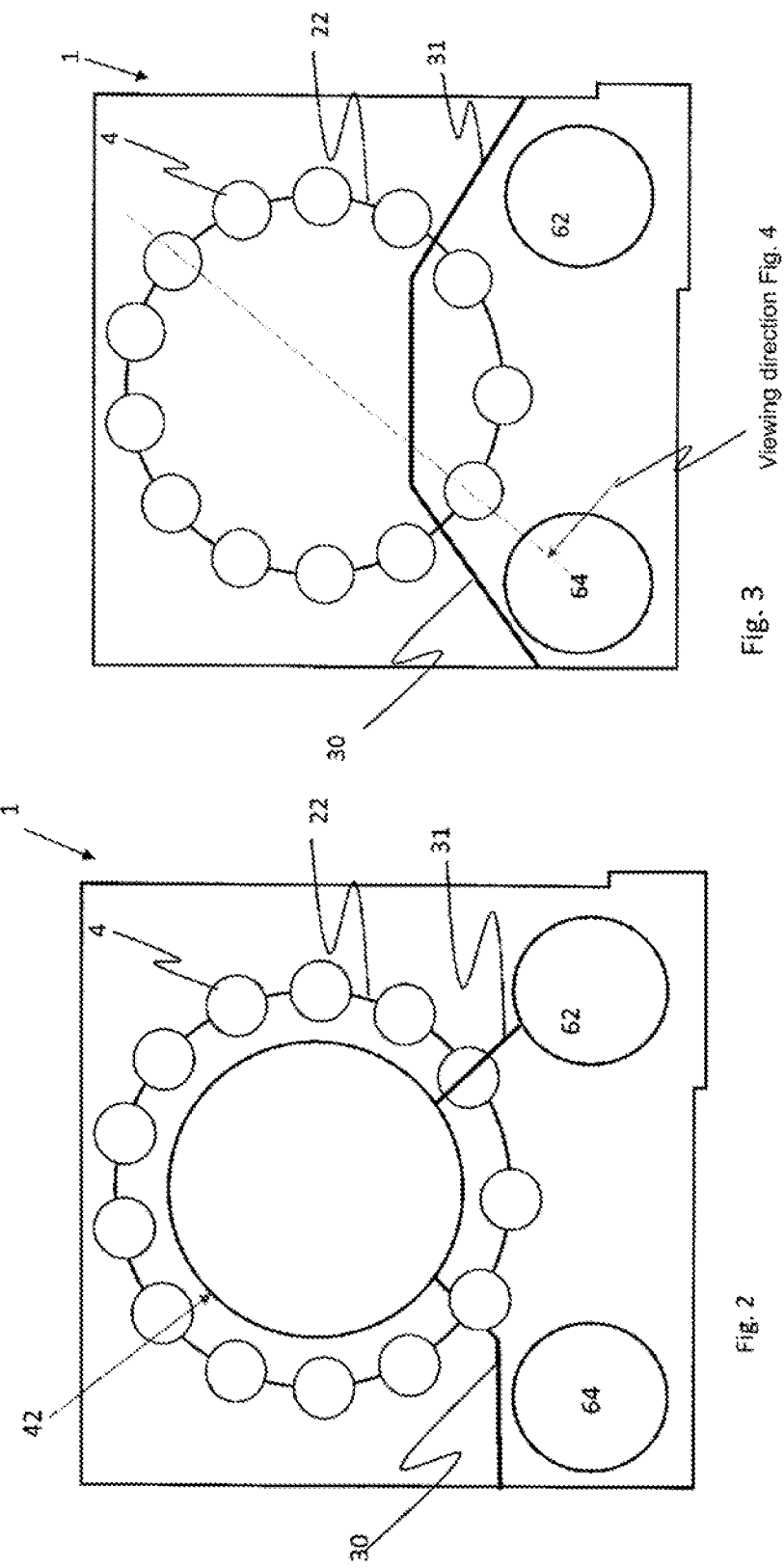
FIG. 2 shows a schematic representation of a device with a partially co-rotating cleanroom boundary.
FIG. 3 shows a schematic representation of an apparatus with a standing clean room boundary.

FIG. 2 shows another illustration of the actual forming device. The rotatable transport carrier with the forming stations arranged thereon can again be seen.

The reference signs 31, 30 and 42 designate a clean room boundary which in this case is designed to partially co-rotate.

During the forming process, as mentioned above, a blowing nozzle is placed on the plastic preforms in order to apply compressed air and preferably sterile air to them. Furthermore, a stretching rod is inserted into the plastic preforms during the expansion process. After the forming process, both the blowing nozzle and the stretching rod are retracted.

In a preferred method, the blowing nozzle and/or the stretching rod are preferably first lifted or retracted when a formed container or the forming station generating this container has crossed the sterile room boundary 30. In this way, the risk of contamination of the formed container is reduced.

FIG. 3 shows an embodiment with a fixed clean room boundary 30, 31. The oblique straight line illustrates the viewing direction for FIG. 4. In the situation shown in FIG. 3, both the feed device 62 and the discharge device 64 are preferably completely within the clean room.

Figure 4:
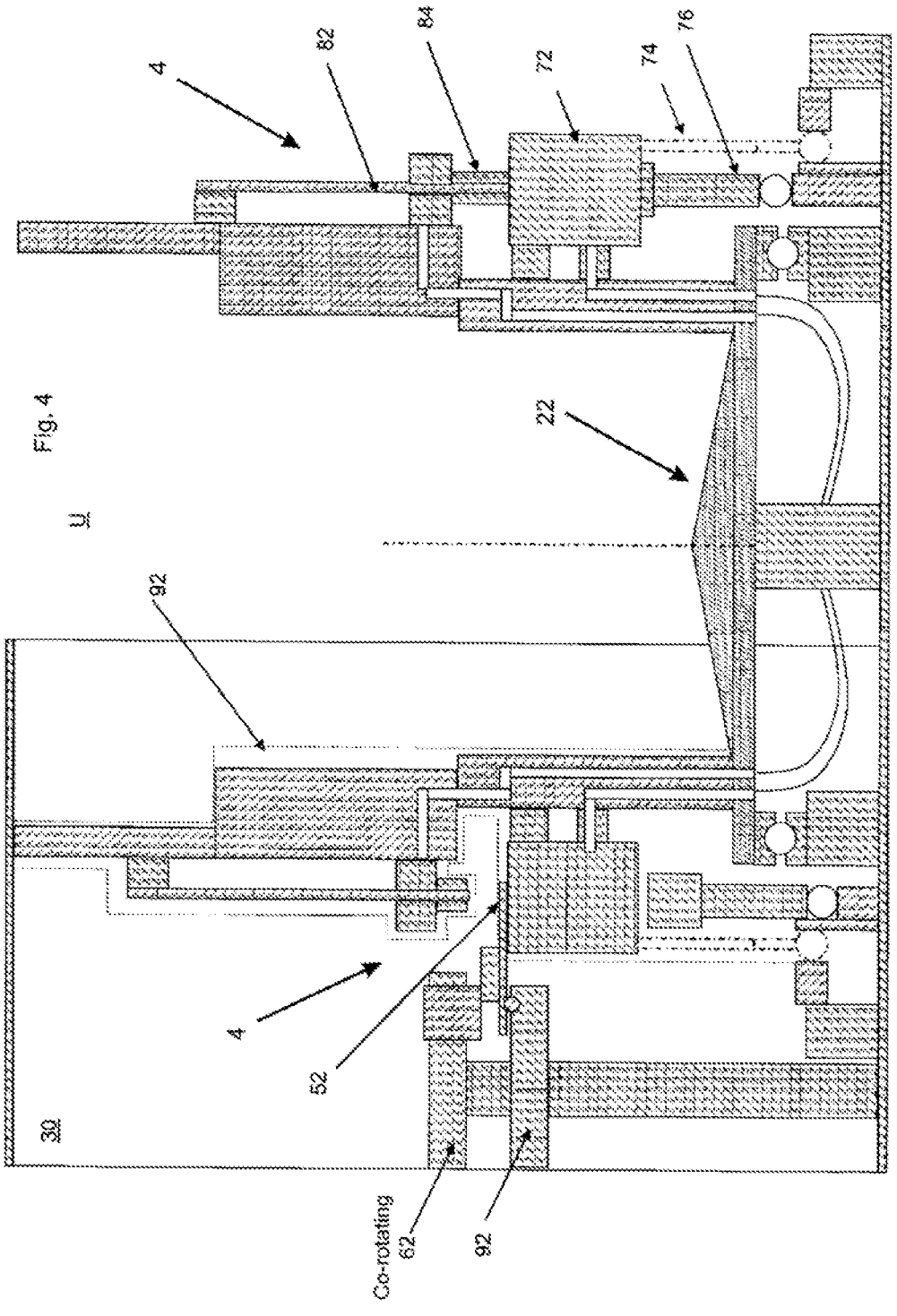
FIG. 4 shows a sectional view of the apparatus perpendicular to the sectional line shown in FIG. 3.

FIG. 4 shows a sectional view of the line shown in FIG. 3. Two forming stations 4 are shown here which are arranged on the blow mold carrier 22. A plastic preform is currently being formed in the forming station on the right.

The reference sign 82 designates a stretching rod, and the reference sign 84 designates and application device which is shown here in a lower position in which it is seated (in particular sealingly) on the plastic preform. The stretching rod is also in a lower position here.

The reference sign 72 shows a mold carrier on which a blow mold part is arranged. Here, the mold carrier is in a closed position. The reference sign 74 designates a locking mechanism which serves to lock the blow mold carriers.

The reference sign 76 designates a carrier for a bottom mold which forms a component of the entire blow mold. In this case, this carrier is in an upper position in which the blow mold is closed.

In turn, reference sign 30 designates the clean room boundary. The reference sign 92 designates a window formed in this clean room boundary through which the blowing station can enter the clean room.

Reference sign 52 designates a gripping clamp for gripping the formed container. This gripping clamp is arranged on the discharge apparatus 62 or a component thereof. The reference sign 94 designates a stationary cam disk. This can serve, for example, for opening and closing the gripping clamp 52.

In the left forming station, both the stretching rod and the application device or blowing nozzle are moved into an upper position in the shown situation.

The blow mold is open in this situation, and the locking device is in an unlocked state (in which the blow mold can be opened). The removal of the containers is accordingly shown on the left side in FIG. 4.

Figure 5:
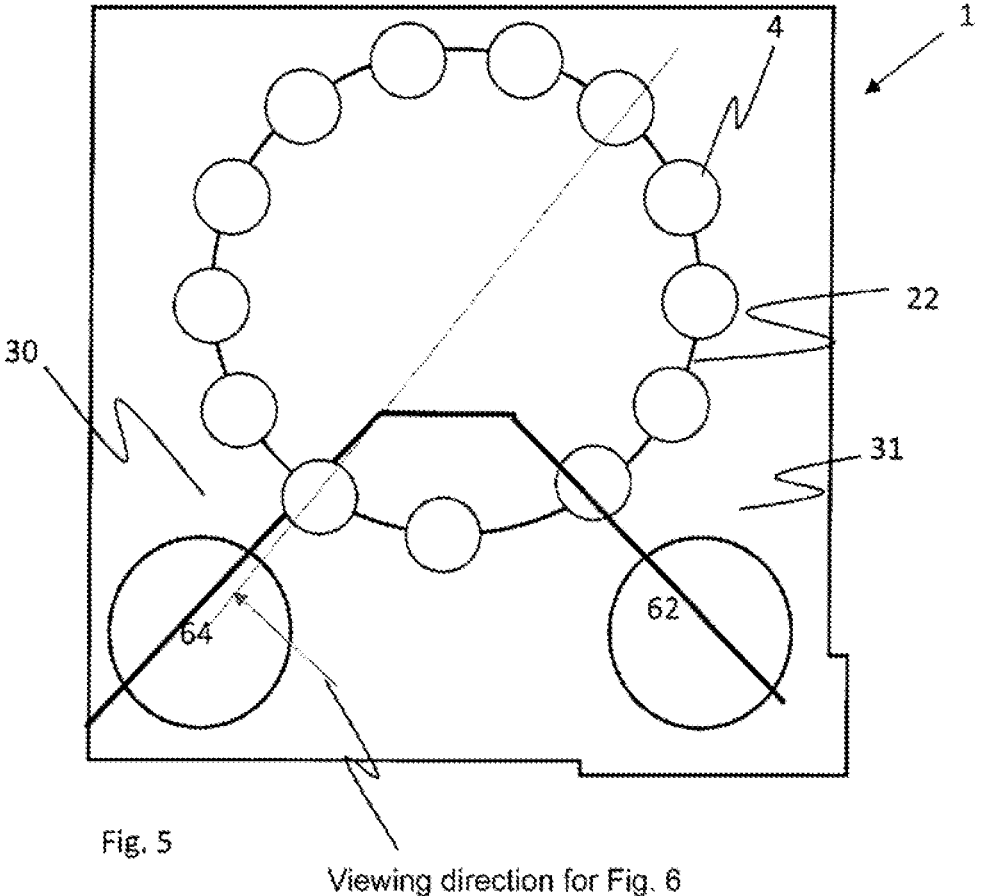
FIG. 5 shows a schematic representation of an apparatus with a fixed clean room boundary.

FIG. 5 shows an embodiment with a fixed clean room limit 30, 31. The oblique straight line illustrates the viewing direction for FIG. 4. In the situation shown in FIG. 3, both the feed device 62 and the discharge device 64 are preferably only partially within the clean room.

Figure 6:
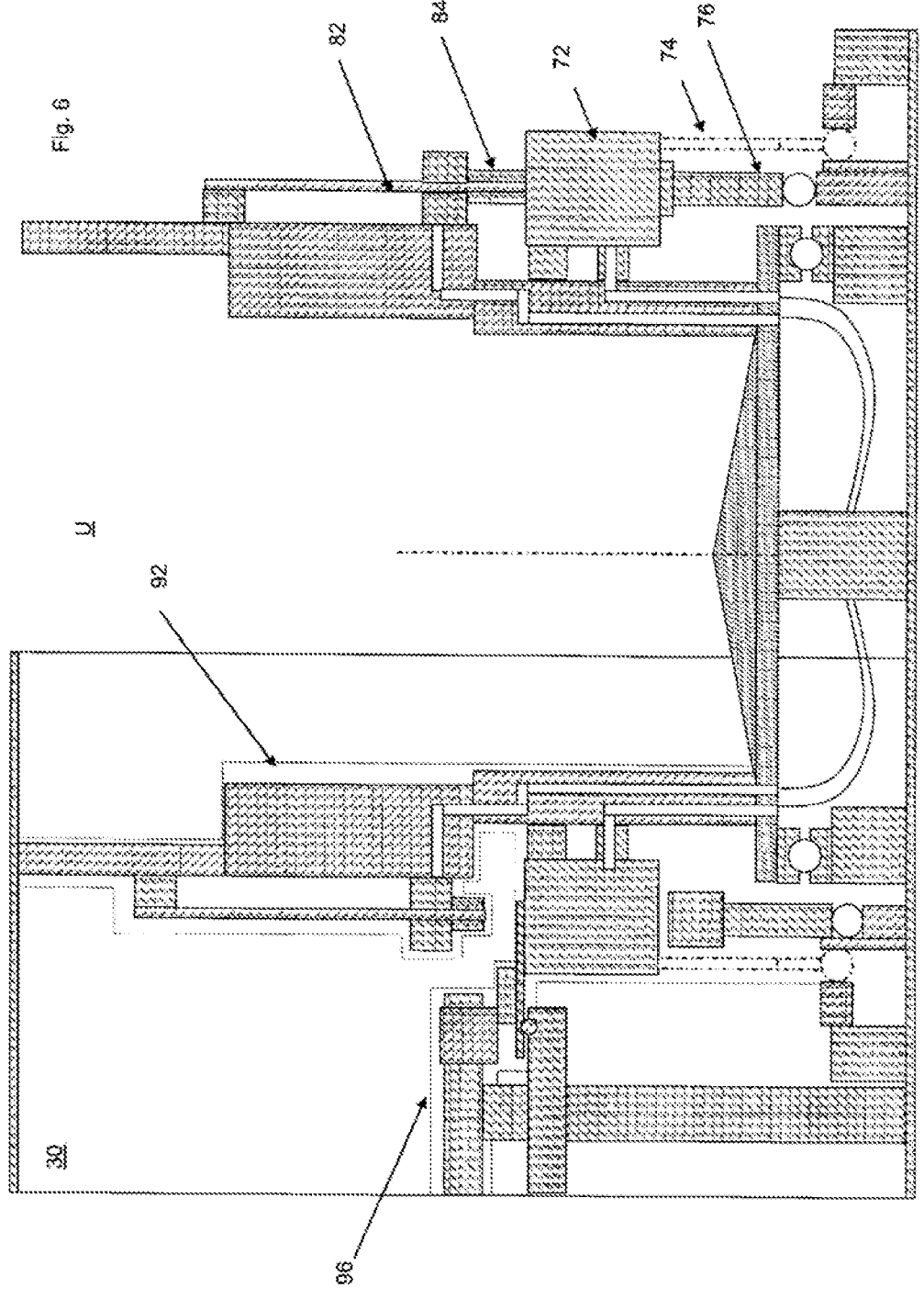
FIG. 6 shows a sectional view of the apparatus perpendicular to the sectional line shown in FIG. 5.

FIG. 6 shows a sectional view on the line shown in FIG. 3. Two forming stations 4 are shown here which are arranged on the blow mold carrier 22. A plastic preform is currently being formed in the forming station on the right. For the further details of the forming station, reference is made to FIG. 4.

The clean room boundary 30 is again shown here. As also shown in the embodiment shown in FIG. 4, the clean room boundary can be formed by a wall.

In contrast to the situation shown in FIG. 4, however, the discharge device is also arranged in the window here, i.e., part of the discharge device is located inside the clean room, and part is outside it.

Figures 7, 8:
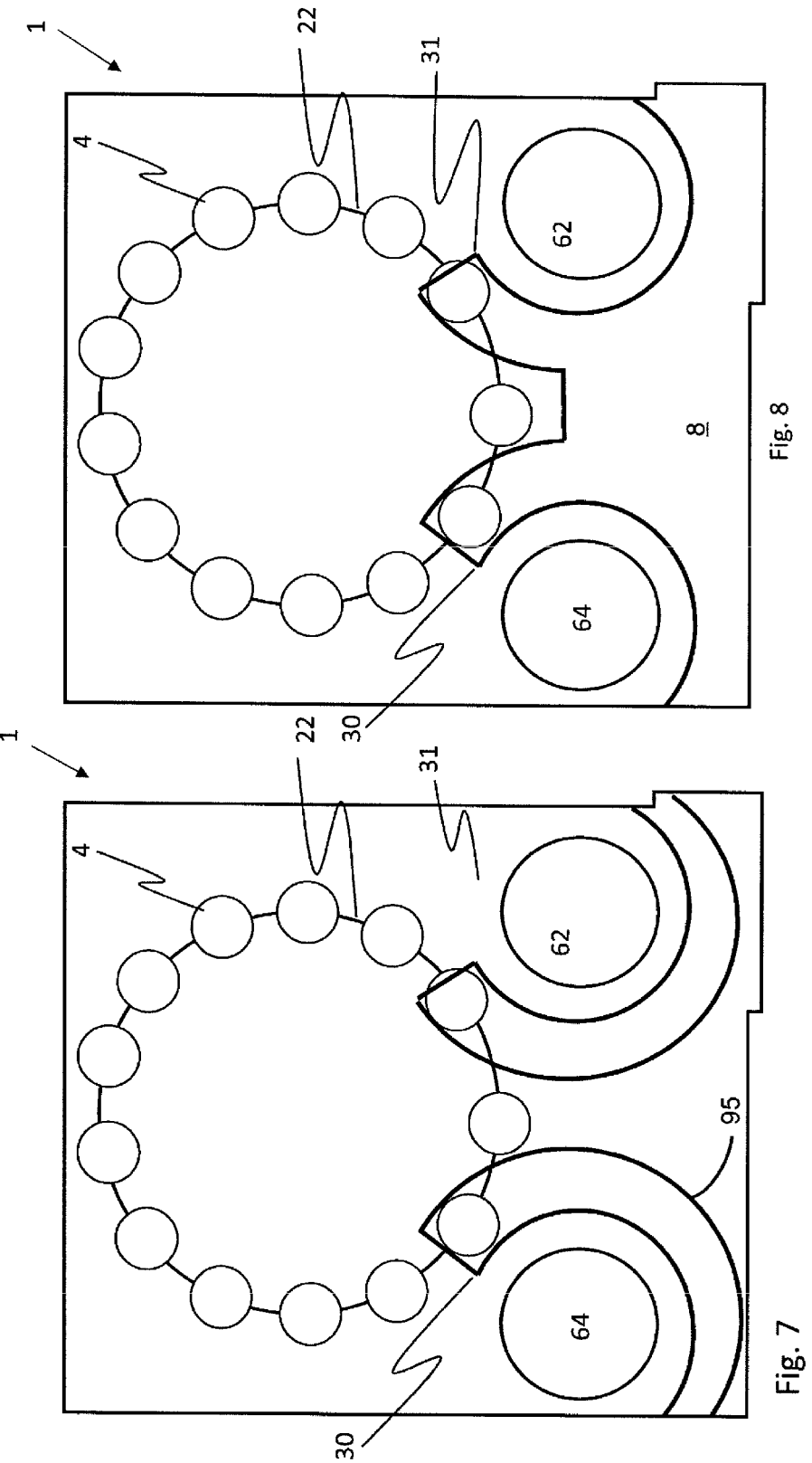
FIG. 7 shows a representation of the apparatus with a transport corridor.
FIG. 8 shows a representation of the apparatus with a clean room boundary and a transport star.

In the situation shown in FIG. 7, a corridor 95 is provided which is opened for the passage of the forming stations or the blow molds and preferably also for the passage of a pivot arm. The clean room boundary 30, 31 is also fixed in this case.

In the situation shown in FIG. 8, a fixed clean room boundary 30, 31 is also provided which extends here around the transport stars 62, 64. Here as well, a corridor is formed which is opened for the passage of the forming stations or blow molds and/or the pivot arm.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

The invention claimed is:

1. An apparatus for forming plastic preforms into plastic containers, having a transport device which transports the plastic preforms to be formed along a predetermined transport path, wherein the transport device has a rotatable transport carrier on which a plurality of forming stations is arranged, wherein these forming stations each have blow-molding devices within which the plastic preforms can be expanded into the plastic containers by applying a flowable medium, and the forming stations each have application devices for applying the flowable medium to the plastic preforms, and wherein the apparatus has a feed device for feeding plastic preforms to be formed to the transport device, and a discharge device for discharging formed containers from the transport device, and wherein the apparatus has a clean room within which the plastic preforms or the plastic containers are transported, wherein the clean room is designed such that the plastic preforms are transported outside the clean room at least temporarily during their expansion.

2. The apparatus according to claim 1, wherein the clean room is designed such that the plastic preforms transported by the feed device and/or the discharge device are transported through this clean room.

3. The apparatus according to claim 1, wherein the apparatus has an ejection device to eject plastic preforms or plastic containers from the transport path.

4. The apparatus according to claim 1, wherein a low concentration of sterilization medium can be applied to region outside the clean room.

5. The apparatus according to claim 1, wherein the apparatus has a first sterilization device for sterilizing and/or a cleaning device for cleaning the plastic preforms and/or the plastic containers, wherein the sterilization device and/or cleaning device is arranged upstream from the forming device.

6. The apparatus according to claim 5, wherein the cleaning device is arranged on the infeed star to the heating device.

7. The apparatus according to claim 3, wherein the ejection device is arranged outside the clean room.

8. The apparatus according to claim 5, wherein the apparatus has a second sterilization device for the sterilization of elements handling the plastic preforms.

9. The apparatus according to claim 1, wherein the apparatus has an inspection device for inspecting the plastic preforms and/or the plastic containers.

10. The apparatus according to claim 1, wherein a filling device for filling the containers is downstream from the forming device, and another treatment device is provided between the forming device and the filling device, which treatment device handles the containers.

11. The apparatus according to claim 1,
wherein
the apparatus has a control device for controlling a gas
pressure within a clean room.

12. The apparatus according to claim 1,
wherein
the apparatus has a robot device which is configured for
carrying out treatment processes on at least one element
of the forming device.

13. The apparatus according to claim 12,
wherein
the treatment processes are selected from a group of
treatment processes which include changes of these
elements, cleaning devices of these elements, steriliza-
tion processes of these elements, and/or the element of
the forming device is selected from a group of elements
which contains blow molds, blow mold parts, blowing
nozzles, stretching rods, gripping clamps, holding man-
drels.

14. The apparatus according to claim 1,
wherein
the clean room is bordered by a wall which has at least one
curved section and/or a bend.

15. A method for forming plastic preforms into plastic
containers, wherein a transport device transports the plastic
preforms to be formed along a predetermined transport path,
wherein the transport device has a rotatable transport carrier
on which a plurality of forming stations is arranged, wherein
these forming stations each have blow-molding devices
within which the plastic preforms are expanded into the
plastic containers by applying a flowable medium, and the
forming stations each have application devices which apply the flowable medium to the plastic preforms, and wherein
the apparatus has a feed device that feeds plastic preforms to
be formed to the transport device, and a discharge device
that discharges formed containers from the transport device,
and wherein the apparatus has a clean room within which the
plastic preforms or the plastic containers are transported,
wherein
the clean room is designed such that the plastic preforms
are transported outside the clean room at least tempo-
rarily during their expansion.

16. The method according to claim 15, wherein
the apparatus has an ejection device which ejects plastic
preforms or plastic containers from the transport path.

17. The method according to claim 15,
wherein
a low concentration of sterilization medium is applied to
a region in which the plastic preforms and/or the plastic
containers are transported during their transport from
the feed device to the discharge device.

18. The method according to claim 15,
wherein
the plastic preforms and/or plastic containers are
inspected, and in response to this inspection, an ejec-
tion of individual plastic preforms or plastic containers
is carried out.

19. The apparatus according to claim 8, wherein
the second sterilization device is arranged at a position
where no handling of the containers takes place.

20. The apparatus according to claim 8, wherein
the second sterilization device is arranged between the
discharge device and the feed device.

* * * * *